United States Patent [19]

Hamano et al.

[11] Patent Number: 4,761,327

[45] Date of Patent: Aug. 2, 1988

[54] BIAXIALLY ORIENTED AROMATIC POLYESTER FILM

[75] Inventors: Hisashi Hamano, Sagamihara; Kinji Hasegawa, Yokohama; Yoshihiro Noumi, Sagamihara; Hideo Katoh, Shiroyama, all of Japan

[73] Assignee: Teijin Limited, Osaka, Japan

[21] Appl. No.: 3,231

[22] Filed: Jan. 14, 1987

[30] Foreign Application Priority Data

Jan. 17, 1986 [JP] Japan .................... 61-6392
Jan. 20, 1986 [JP] Japan .................... 61-7873
Jan. 20, 1986 [JP] Japan .................... 61-205769

[51] Int. Cl.$^4$ .................. B32B 27/06; C08L 67/02
[52] U.S. Cl. .................. 428/220; 428/480; 428/694; 428/910; 525/446; 523/181; 523/220; 524/539
[58] Field of Search .............. 428/480, 694, 910, 220; 525/446; 523/220, 181

[56] References Cited

U.S. PATENT DOCUMENTS

| | | | |
|---|---|---|---|
| 3,821,156 | 6/1974 | Farrar | 523/220 |
| 3,884,870 | 5/1975 | Dodson | 523/220 |
| 4,474,843 | 10/1984 | Miyoshi | 428/212 |
| 4,590,119 | 5/1986 | Kawakami | 428/216 |
| 4,595,715 | 6/1986 | Kuze | 523/181 |
| 4,654,249 | 3/1987 | Barbey | 428/694 |

Primary Examiner—Patricia Short
Attorney, Agent, or Firm—Sherman and Shalloway

[57] ABSTRACT

A biaxially oriented film formed from a intimate mixture comprising (I) an aromatic polyester, (II) 0.005 to 1.0% by weight, based on the aromatic polyester, of fine particles of a silicone resin having (a) a composition represented by the following formula (A)

$$R_xSiO_{2-x/2} \tag{A}$$

wherein R represents a hydrocarbon group having 1 to 7 carbon atoms, and x is a number of from 1 to 1.2, (b) a volume shape factor (f), represented by the following formula (B), of more than 0.4 but not exceeding $\pi/6$ $$f = V/D^3 \tag{B}$$

wherein V is the average volume ($\mu m^3$) of the particles and D is the average maximum particle diameter ($\mu m$) of the particle, and (c) an average particle diameter of 0.3 to 4 $\mu m$. The film optionally contains (III) 0.005 to 1% by weight, based on the aromatic polyester, of inert fine particles having an average particle diameter of 0.01 to 1 $\mu m$ but being smaller than the average particle diameter of the silicone resin particles. The film is useful for a base film on a magnetic recording medium.

17 Claims, 2 Drawing Sheets

BIAXIALLY ORIENTED AROMATIC POLYESTER FILM

This invention relates to a biaxially oriented aromatic polyester film, and more specifically to a biaxially oriented aromatic polyester film containing fine particles of a silicone resin and having flatness and excellent slipperiness and abrasion resistance.

Polyesters typified by polyethylene terephthalate have been widely used as magnetic tapes, photographic films, condenser films, packaging films, etc. because of their excellent physical and chemical properties. The slipperiness and abrasion resistance of these films greatly affect operability in the film forming step and processing steps in various uses and also the quality of the products. In particular, when the resulting aromatic polyester film is used as a magnetic tape by forming a magnetic layer on its surface, the friction between the film surface and the coating roll used in coating the magnetic layer and the resultant wear are very heavy so that creases and scratches tend to occur on the film surface. Furthermore, after the film coated with a magnetic layer is slit to form tapes for audio, video or computer applications, much wear occurs in the tapes as a result of contact with many guide portions, a reproduction head, etc. during drawing from reels or cassettes, windup, or other operations. Consequently, scratches and distortions occur, and also abrasion of the film surface causes deposition of white powdery material. These defects frequently lead to dropout, or a reduction in output magnetic recording signal level.

Generally, to improve the slipperiness and abrasion resistance of a film, a method is employed in which raised and depressed portions are formed on the surface of the film to reduce the area of contact between the film surface and a guide roll, etc. Roughly, this method is performed by (i) precipitating inert particles from the catalyst residue in a polymer used as a material for the film, and (ii) adding inert inorganic particles. Generally, the effect of improving the slipperiness is greater as the size of the fine particles in the starting polymer is larger. However, for precision applications as in magnetic tapes, particularly video tapes, the large size of the particles can be the cause of occurrence of dropout and other defects, and therefore, the raised and depressed portions on the film surface should be as fine as possible. Hence, there has been a demand for providing a compromise between these contradictory properties.

For improvement in the slipperiness of a film, the prior art discloses a method in which inorganic particles such as silicon dioxide, titanium dioxide, calcium carbonate, talc, clay and calcined kaolin are added to a polyester used as a film substrate (see, for example, Japanese Laid-Open Patent Publication No. 57562/1979), and a method in which fine particles containing calcium, lithium or phosphorus are deposited within the polymerization system for producing a polyester (see, for example, Japanese Patent Publication No. 32914/77).

In film formation, the above fine particles insoluble in the polyester form protrusions on the film surface, and increase the slipperiness of the film. The method of improving the slipperiness of the film by providing protrusions of fine particles, however, gives rise to the essential problem that the protrusions, on the other hand, impair the flatness of the film surface. Attempts have been made to provide a compromise between flatness and slipperiness by utilizing a combination of fine particles having a relatively large particle size and fine particles having a relatively small particle size.

U.S. Pat. No. 3,821,156 discloses a combination of 0.02 to 0.1% by weight of calcium carbonate having an average particle size of 0.5 to 30 microns and 0.01 to 0.5% by weight of silica or hydrated aluminum silicate having an average particle size of 0.01 to 1.0 micron.

U.S. Pat. No. 3,884,870 discloses a combination of about 0.002 to about 0.018% by weight of fine inert particles, such as calcium carbonate, calcined aluminum silicate, hydrated aluminum silicate, magnesium silicate, calcium silicate, calcium phosphate, silica, alumina, barium sulfate, mica and diatomaceous earth, having a particle size of about 0.5 to about 30 microns and about 0.3 to about 2.5% by weight of fine inert particles, such as silica, calcium carbonate, calcined calcium silicate, hydrated calcium silicate, calcium phosphate, alumina, barium sulfate, magnesium sulfate and diatomaceous earth, having a particle size of about 0.01 to about 1.0 micron.

U.S. Pat. No. 3,980,611 discloses that fine particles of calcium phosphate having three particle size grades of less than 1.0 micron, 1 to 2.5 microns and more than 2.5 microns are combined, and added to a polyester in a total amount of not more than 5,000 ppm.

Japanese Patent Publication No. 41,648/1980 (Laid-Open Patent Publication No. 71,154/1978) proposes a combination of 0.22 to 1.0% by weight of fine particles having a particle size of 1.2 to 2.5 microns and 0.003 to 0.25% by weight of fine particles having a particle size of 1.8 to 10 microns, the fine particles being those of an oxide or inorganic salt of an element of Groups II, III and IV of the periodic table.

Japanese Patent Publication No. 40,929/1980 (Laid-Open Patent Publication No. 11,908/1977) discloses a combination of 0.01 to 0.08% by weight of fine inert inorganic particles having a particle size of 3 to 6 microns and 0.08 to 0.3% by weight of fine inert inorganic particles having a particle size of 1 to 2.5 microns, the total amount of these fine particles having different particle sizes being 0.1 to 0.4% by weight and the ratio of the large size particles to the small size particles being from 0.1 to 0.7.

Japanese Laid-Open Patent Publication No. 78,953/1977 discloses a biaxially oriented polyester film containing 0.01 to 0.5% by weight of inert particles having a particle size of 10 to 1,000 microns and 0.11 to 0.5% by weight of calcium carbonate having a particle size of 0.5 to 15 microns. This patent document lists up various inorganic substances other than calcium carbonate as the inert particles having a particle size of 10 to 1,000 microns in its general description, but only discloses specific examples in which silica or clay normally available as fine particles having a particle size of 10 to 1,000 microns is uses as an inorganic substance.

It is an object of this invention to provide a biaxially oriented aromatic polyester film having excellent surface flatness, slipperiness and abrasion resistance.

Another object of this invention is to provide a biaxially oriented aromatic polyester film having excellent surface flatness, slipperiness and abrasion resistance in which minute protrusions attributed to fine particles of a silcone resin are formed on the film surface.

An additional object of this invention is to provide a magnetic tape having excellent surface flatness, slipperiness and abrasion resistance as well as excellent magnetic recording characteristics.

Further objects of this invention will be apparent from the following description.

According to this invention, these objects and advantages of this invention are firstly achieved by a biaxially oriented film formed from an intimate mixture comprising (I) an aromatic polyester, and
(II) 0.005 to 1.0% by weight, based on the aromatic polyester, of fine particles of a silicone resin having
  (a) a composition represented by the following formula (A)

$$R_xSiO_{2-x/2} \qquad (A)$$

wherein R represents a hydrocarbon group having 1 to 7 carbon atoms, and x is a number of from 1 to 1.2,
  (b) a volume shape factor (f), represented by the following formula (B), of more than 0.4 but not exceeding $\pi/6$ $$f = V/D^3 \qquad (B)$$

wherein V is the average volume ($\mu m^3$) of the particles and D is the average maximum particle diameter ($\mu m$) of the particle,
  and
  (c) an average particle diameter of 0.01 to 4 $\mu m$.

BRIEF DESCRIPTION OF THE DRAWINGS

In the accompanying drawings.

Figure 1:
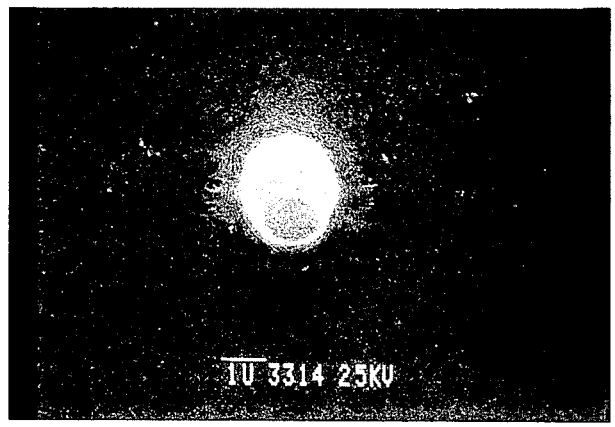
FIG. 1 is a scanning electron micrograph showing the state of fine silicone resin particles and the polyester around them in the biaxially oriented film of this invention.

The aromatic polyester (I) used in this invention is a polyester derived from an aromatic dicarboxylic acid or its derivative as a main acid component and an aliphatic glycol as a main glycol component. This polyester is substantially linear and has film formability, particularly film formability by melt-molding. Examples of the aromatic dicarboxylic acid include terephthalic acid, naphthalenedicarboxylic acid, isophthalic acid, diphenoxyethanedicarboxylic acid, diphenyldicarboxylic acid, diphenyletherdicarboxylic acid, diphenylsulfonedicarboxylic acid, diphenylketonedicarboxylic acid and anthracenedicarboxylic acid. Examples of the aliphatic glycol are polymethylene glycols having 2 to 10 carbon atoms such as ethylene glycol, trimethylene glylcol, tetramethylene glycol, pentamethylene glycol, hexamethylene glycol and decamethylene glycol, and alicyclic diols such as cyclohexane dimethanol.

Preferred polyesters for use in this invention are those having an alkylene terephthalate and/or an alkylene naphthalate as a main constituent. Especially preferred are polyethylene terephthalate, polyethylene naphthalate, and copolymers in which at least 80 mole% of the entire dicarboxylic acid component consists of terephthalic acid and/or naphthalenedicarboxylic acid and at least 80 mole% of the entire glycol component consists of ethylene glycol. In this case, not more than 20 mole% of the entire acid component may consist of the other aromatic dicarboxylic acid mentioned above, an aliphatic dicarboxylic acid such as adipic acid or sebacic acid, or an alicyclic dicarboxylic acid such as cyclohexane-1,4-dicarboxylic acid. Furthermore, not more than 20 mole% of the entire glycol component may be the other glycol mentioned above, an aromatic diol such as hydroquinone, resorcinol and 2,2'-bis(4-hydroxyphenyl)propane, an aliphatic diol containing an aromatic moiety such as 1,4-dihydromethylbenzene, or a polyalkylene glycol (polyoxyalkylene glycol) such as polyethylene glycol, polypropylene glycol or polytetramethylene glycol.

The aromatic polyester used in this invention may further include those which contain a component derived from a hydroxycarboxylic acid, for example an aromatic hydroxycarboxylic acid such as hydroxybenzoic acid or an aliphatic hydroxycarboxylic acid such as omegahydroxycaproic acid in an amount of up to 20 mole% based on the total amount of the dicarboxylic acid component and the hydroxycarboxylic acid component. Furthermore, the aromatic polyesters used in this invention may further contain copolymerized therewith a trifunctional or higher polycarboxylic acid or polyhydroxy compound such as trimellitic acid or pentaerythritol in an amount in which the polyesters remain substantially linear, for example in an amount of not more than 2 mole% based on the total amount of the acid component.

The aforesaid polyesters are known per se, and can be produced by methods known per se.

Preferably, the aromatic polyesters used in the invention have an intrinsic viscosity, determined at 35° C. for a solution in o-chlorophenol, of about 0.4 to about 1.0 dl/g.

The biaxially oriented aromatic polyester film of this invention has many minute protrusions on its surface which are attributed to many substantially inert solid fine particles dispersed in the aromatic polyester.

The fine particles of a silicone resin (II) in the present invention have a composition represented by the following formula (A)

$$R_xSiO_{2-x/2} \qquad (A)$$

wherein R represents a hydrocarbon group having 1 to 7 carbon atoms, and x is a number of 1 to 1.2.

R in formula (A) represents a hydrocarbon group having 1 to 7 carbon atoms, preferably alkyl groups having 1 to 7 carbon atoms, a phenyl group or a tolyl group. The $C_1$-$C_7$ alkyl groups may be linear or branched, and include, for example, methyl, ethyl, n-propyl, iso-propyl, n-butyl, iso-butyl, tert-butyl, n-pentyl and n-heptyl groups.

R preferably represents methyl and phenyl groups, and the methyl group is especially preferred.

In the formula (A), x is a number of from 1 to 1.2. When x is 1, formula (A) may be written as formula (A-1).

$$RSiO_{1.5} \qquad (A-1)$$

wherein R is as defined.

The composition represented by formula (A-1) is derived from the following structural portion in the three-dimensional polymer chain structure of the silicone resin.

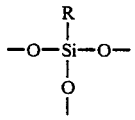

When x is 1.2 in formula (A), formula (A) may be written as formula (A-2).

$$R_{1.2}SiO_{1.4} \quad (A-2)$$

wherein R is as defined.

The composition of formula (A-2) can be understood as consisting of 0.8 mole of the structure of formula (A-1) and 0.2 mole of a structure of the following formula (A')

$$R_2SiO \quad (A')$$

wherein R is as defined.

The formula (A') is derived from the following structural portion in the three-dimensional polymer chain of the silicone resin.

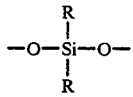

It will be seen from the foregoing description that the composition of formula (A) in this invention consists substantially only of the structure of formula (A-1), or of a structure in which the structure of formula (A-1) and the structure of formula (A-2) are bonded to each other at random in suitable proportions.

Preferably, in formula (A), x is between 1 and 1.1.

The silicone resin particles (II) in accordance with this invention have a volume shape factor (f), defined by the following formula (B), of more than 0.4 but not exceeding $\pi/6$.

$$f = V/D^3 \quad (B)$$

wherein V is the average volume ($\mu m^3$) of each of the particles, and D is the average maximum particle diameter ($\mu m$) of the particles.

It should be understood that in the above definition, the average maximum particle diameter D of the particles denotes the longest distance between two points of crossing of arbitrary straight lines with the peripheral surface of a particle.

The preferred f values of the silicone resin particles used in this invention is 0.44 to $\pi/6$, more preferably 0.48 to $\pi/6$. Particles with an f value of $\pi/6$ are true spherical particles. The use of silicone resin particles having an f value below the specified lower limit makes it very difficult to control the various properties of the film surface.

The silicone resin particles used in this invention also have an average particle diameter of 0.01 to 4 $\mu m$. If silicone resin particles having an average particle diameter of less than 0.01 $\mu m$ are used, the effect of improving the slipperiness and abrasion resistance of the film surface is insufficient. If silicone resin particles having an average diameter of more than 4 $\mu m$ are used, the resulting film has only insufficient surface flatness.

The preferred average particle diameter is 0.05 to 3 $\mu m$.

The average particle diameter, as used herein, is the diameter at 50% integration of an equivalent spherical particle size distribution calculated on the basis of the Stoke's equation.

The silicone resin particles used in this invention can be produced, for example, by hydrolyzing and condensing a trialkoxysilane represented by the following formula $$RSi(OR')_3$$

wherein R represents a hydrocarbon group having 1 to 7 carbon atoms and R' represents a lower alkyl group, or its partially hydrolyzed and condensed product in the presence of ammonia or an amine such as methylamine, dimethylamine or ethylenediamine with stirring. According to the above method using the above starting material, silicone resin particles having the composition of formula (A-1) can be produced.

When in the above method, a dialkoxysilane of the formula $R_2Si(OR')_2$ wherein R and R' are as defined is used together with the above trialkoxysilane, silicone resin particles having the composition (A-2) can be produced.

Preferably, the silicone resin particles used in this invention have a particle size distribution ratio ($\gamma$), represented by the following equation, of from 1 to 1.4.

$$\gamma = D_{25}/D_{75}$$

In the above equation, $D_{25}$ is the particle diameter of the fine particles when their cumulative weight is 25% based on their total weight, and $D_{75}$ is the particle diameter of the fine particles when their cumulative weight is 75% based on their total weight, the cumulative weights being calculated beginning with the largest particle size.

The particle size distribution ratio is more preferably in the range of from 1 to 1.3, most preferably in the range of from 1 to 1.15.

The intimate mixture of the aromatic polyester (I) and the fine silicone resin particles (II) contains the fine particles (II) in an amount of 0.005 to 1.0% by weight based on the aromatic polyester. If the amount of the fine particles (II) is less than 0.005% by weight, the effect of improving the slipperiness and abrasion resistance of the film is insufficient. If it exceeds 1.0% by weight, the flatness of the film is reduced.

Preferably, the amount of the fine particles (II) is 0.01 to 0.5% by weight based on the aromatic polyester.

The silicone resin particles used in this invention impart surface flatness, slipperiness and abrasion resistance to a polyester film. Investigations of the present inventors have shown that the excellent abrasion resistance is attributed to the fact that the silicone resin particles have very high affinity for the aromatic polyester to be mixed.

When the surface of the film of this invention containing the fine silicone resin particles is subjected to ion-etching to expose the silicone resin particles in the film and observed under a scanning electron microscope, it is seen that the peripheral surfaces of the fine silicone resin particles make substantial contact with the aromatic polyester substrate, or in other words, there are little or no voids existing betweeen the peripheral surfaces of the silicone resin particles and the aromatic polyester substrate.

When 40 fine particles of the silicone resin in each of the films of the invention are observed under a scanning electron microscope as above, at least 16 (40%) out of 40 particles have no voids in substantially all of the films; at least 20 (50%) out of them have no void in most of the films; and at least 24 (60%) out of them have no void in a predominant proportion of the films.

The film of this invention has a void ratio (the ratio of the long diameter of a void to the long diameter of a particle, which is another measure of the high affinity of the silicone resin particles with the aromatic polyester substrate, of from 1.0 to 1.1 in substantially all of the films of the invention, from 1.0 to 1.08 in most of them, and from 1.0 to 1.05 in a major proportion of them.

The biaxially oriented aromatic polyester film of this invention which has little voids and a void ratio of nearly 1.0 has especially good abrasion resistance. Some high-strength polyester films having been stretched at a high ratio and therefore possessing a high Young's modulus have scarcely any void. This shows that the affinity of the silicone resin particles for the aromatic polyester is excellent.

Generally, aromatic polyesters have no affinity for inert particles (lubricant). Hence, when an unstretched film of an aromatic polyester produced by melt-fabrication is biaxially stretched, peeling usually occurs in the interface between the fine particles and the aromatic polyester to form voids around the fine particles. These voids tend to become larger as the fine particles are larger, their shape is nearer to a sphere, the fine particles are less susceptible to deformation, the stretch area ratio in the stretching of the unstretched film is higher and the stretching is carried out at lower temperatures. Since the increasing size of the voids makes the shape of the protrusions gentler, and increases the coefficient of friction. Furthermore, when the biaxially oriented aromatic polyester film is repeatedly used, small scratches that occur on the voids cause dropping of the particles. This reduces the durability of the film and causes occurrence of abraded powders.

Figure 2:
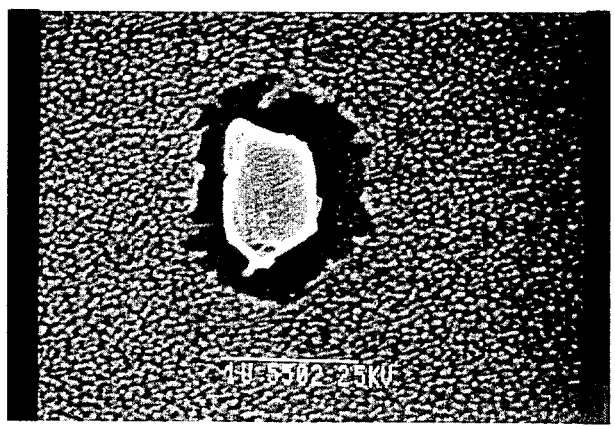
FIG. 2 is a scanning electron micrograph showing the state of fine inorganic particles and the polyester around them in a comparative biaxially oriented film.

The amount of voids around conventional inorganic inert lubricant particles is considerably large as shown, for example, in FIG. 2. These voids further increase in size in a high-strength polyester film. In processing steps, such as a calendering step, for the production of a magnetic tape, the film usually has inferior abrasion resistance.

Since the silicone resin particles used in this invention have high affinity for the aromatic polyester substrate, there are little chances of voids occurring around the particles. The use of these silicone resin particles can therefore inhibit chances of occurrence of voids which generally become larger as the particles increase in size. It has been shown in accordance with this invention that by using a combination of silicone resin particles of a relatively large particle size and particles of a relatively small particle size which have less chances of void occurrence, there can be obtained a film having excellent travelling property, abrasion resistance, fatigue resistance, electrical insulation and transparency while retaining the advantages of using two types of particles.

Such a biaxially oriented film is a biaxially oriented film formed from an intimate mixture comprising
(I) an aromatic polyester,
(II) 0.005 to 1% by weight, based on the aromatic polyester, of fine particles of a silicone resin having
  (a) a composition represented by formula (A) above,
  (b) a volume shape factor f, defined by formula (B), of more than 0.4 but not exceeding $\pi/6$, and
  (c) an average particle diameter of 0.3 to 4 $\mu$m, and
(III) 0.005 to 1% by weight, based on the aromatic polyester, of inert fine particles having an average particle diameter of 0.01 to 1 $\mu$m but being smaller than the average particle diameter of the silicone resin particles.

The aromatic polyester (I) and the silicone resin particles (II) are the same as described above. The silicone resin particles, however, have a relatively large average particle diameter of 0.3 to 4 $\mu$m. The inert fine particles (III) having a smaller average particle diameter than the silicone resin particles are inert to the aromatic polyester, insoluble, and solid at room temperature. They may be externally added particles or internally formed particles. They may be metal salts of organic acids or inorganic materials. Prferred inert particles include, for example, (1) calcium carbonate, (2) silicon dioxide (including hydrates, diatomaceous earth, silica sand, quartz, etc.), (3) alumina, (4) silicates having an $SiO_2$ content of at least 30% by weight [such as amorphous or crystalline clay minerals], aluminosilicate compounds (including calcined products or hydrates), chrysotile, zircon and flyash], (5) oxides of Mg, Zn, Zr and Ti, (6) sulfates of Ca and Ba, (7) phosphates of Li, Na and Ca (including both monohydrogen salts and dihydrogen salts), (8) benzoic acid salts of Li, Na and K, (9) terephthalic acid salts of Ca, Ba, Zn and Mn, (10) titanic acid salts of Mg, Ca, Ba, Zn, Cd, Pb, Sr, Mn, Fe, Co and Ni, (11) chromic acid salts of Ba and Pb, (12) carbon (such as carbon black or graphite), (13) glass (such as glass powder and glass beads), (14) $MgCO_3$, (15) fluorspar, and (16) ZnS. Especially preferred inert particles are silicic anhydride, hydrous silicic acid, aluminum oxide, aluminum silicate (including a calcined product and a hydrate), monolithium phosphate, trilithium phosphate, sodium phosphate, calcium phosphate, barium sulfate, titanium oxide, lithium benzoate, double salts of these (including hydrates), glass powder, clays (including kaolin, bentonite and terra alba), talc and diatomaceous earth. Among these inert fine particles (III), externally added particles are especially preferred.

The silicone resin particles (II) have an average particle diameter of 0.3 to 4 $\mu$m, preferably 0.3 to 2 $\mu$m, especially preferably 0.5 to 1.5 $\mu$m.

The inert particles (III) have an average particle diameter of 0.01 to 1 $\mu$m which should however be smaller than the average particle diameter of the silicone resin particles (II). Preferably, the inert fine particles (III) have an average particle diameter of 0.05 to 0.8 $\mu$m, especially 0.1 to 0.5 $\mu$m.

The content of the inert fine particles (III) is 0.005 to 1% by weight, preferably 0.01 to 1% by weight, more preferably 0.01 to 0.5% by weight, especially preferably 0.05 to 0.3% by weight, based on the aromatic polyester. The content of the silicone resin particles (II) is 0.005 to 1% by weight, preferably 0.01 to 1% by weight, more preferably 0.04 to 0.5% by weight, especially preferably 0.1 to 0.5% by weight.

If the content of the inert fine particles (III) or the silicone resin particles (II) is too low, no synergistic effect is obtained of using large and small particles, and the resulting film has reduced travelling property, abrasion resistance, fatigue resistance, load-deformability, and edge-uniformity. On the other hand, if the content of the inert particles (III) is too high, the frequency of void occurrence attributed to the small particles in the polymer tends to increase, and the resulting film has reduced abrasion resistance, fatigue resistance, load-deformability, breakdown voltage and transparency. If the content of the silicone resin particles (II) is too high, the surface of the film becomes so rough as to reduce electromagnetic converting characteristics in magnetic tapes.

In order to mix the aromatic polyester intimately with the silicone resin particles or both the silicone resin particles and the inert fine particles in the production of the biaxially oriented film of this invention, these fine particles may be incorporated in starting materials forming the aromatic polyester before polymerization, or in a polymerization reactor during polymerization, or kneaded well with the aromatic polyester after the polymerization in an extruder for pelletization, or in an extruder for melt-extruding the polymer into sheet form.

The polyester film of the present invention can be prepared, for example, by stretching an unstretched polyester film having an intrinsic viscosity of 0.35 to 0.9 dl/g obtained by melt extrusion at a temperature between the melting point (Tm) and Tm+70° C. in the longitudinal or transverse direction at a temperature between the second order transition point (Tg) of the polyester and Tg+70° C. at a stretch ratio of 2.5 to 5.0, and subsequently in a direction at right angles to the first stretching direction (when the first stretching direction is longitudinal, the second is transverse) at a temperature between Tg and Tg+70° C. and a stretch ratio of 2.5 to 5.0. The area stretch ratio is preferably between 12 and 22. The stretching process may be simultaneous biaxial stretching or successive biaxial stretching.

Then, the biaxially oriented film is set by heating it at a temperature between Tg+70° C. and Tm, for example between 190° and 230° C. for polyethylene terephthalate, for 1 to 60 seconds.

The thickness of the film is 1 to 100 microns, preferably 1 to 50 microns, especially preferably 1 to 25 microns.

The film of this invention has a low coefficient of friction during travelling, and its operability is very good. As a base film of a magnetic tape it has good durability and its abrasion is very little when in frictional contact with the travelling portions of magnetic recording and playback devices.

Furthermore, during film formation, the biaxially oriented polyester film of this invention has good windability, and winding creases scarcely occur. In addition, it can be cut sharp with dimensional stability in a slitting operation.

Because of the aforesaid advantages of the film of this invention both as a film product and during film formation, the biaxially oriented polyester film of this invention is very useful in magnetic applications. It can be produced easily and stably. The film of this invention is particularly suitable as a base film of high grade magnetic recording media such as micro-recording materials, floppy discs, ultrathin high-density magnetic recording films for long-hour recording in audio and video applications, and magnetic recording films for recording and playback of high-quality images.

Accordingly, this invention also provides a magnetic recording medium comprising the biaxially oriented polyester film of this invention and a magnetic layer formed on one or both surfaces thereof.

Magnetic layers and methods for providing them on base films are well known, and can also be used in this invention.

For example, when a magnetic layer is formed on the base film by coating a magnetic paint, there can be used a ferromagnetic powder such as $\gamma$-$Fe_2O_3$, Co-containing $\gamma$-$Fe_2O_3$, $Fe_3O_4$, Co-containing $Fe_3O_4$, $CrO_2$, and barium ferrite in the magnetic paint. Known thermoplastic resins, thermosetting resins, reactive resins or mixtures of these may be used as a binder together with such a magnetic powder. Specific examples of such resins are a vinyl chloride/vinyl acetate copolymer and a polyurethane elastomer.

The magnetic paint may further include a polishing agent such as $\alpha$-$Al_2O_3$, a conductivity imparting agent such as carbon black, a dispersant such as lecithin, a lubricant such as n-butyl stearate or lecithinic acid, a curing agent such as an epoxy resin, and a solvent such as methyl ethyl ketone, methyl isobutyl ketone and toluene.

When the magnetic layer is to be formed by depositing a thin metal film on the base film, there can, for example, be used a vacuum deposition method, a sputtering method, an ion plating method, a chemical vapor deposition method (CVD), and an electroless plating method. Useful metals include, for example, iron, cobalt, nickel and their alloys such as Co-Ni-P alloy, Co-Ni-Fe alloy, Co-Cr alloy or Co-Ni alloy.

The various properties referred to in this invention are defined and measured as described below.

(1) Average particle diameter (DP) of particles

The particle diameter is measured by using a centrifugal particle size analyzer (Model CP-50 manufactured by Shimadzu Seisakusho K.K.). On the basis of the resulting centrifugal sedimentation curve, a cumulative curve of the particle diameters of the individual particles and their amounts is drawn. The particle diameter corresponding to 50 mass percent is read, and defined as the average particle diameter. (See Japanese-language book "Technique of Particle Size Measurement", (pages 242-247, 1975, published by Nikkan Kogyo Press.)

(2) Particle size distribution ratio ($\gamma$) of particles

On the basis of the centrifugal sedimentation curve obtained in the measurement of the average diameter of particles in section (1) above, a cumulative curve of the particle diameters of the individual particles and their amounts is drawn. The particle diameter ($D_{25}$) at which the cumulative weight of the particles calculated beginning with the largest particle size corresponds to 25 mass percent and the particle diameter ($D_{75}$) at which the cumulative weight of the particles calculated beginning with the largest particle size corresponds to 75 mass percent are read from the cumulative curve. The $D_{25}$ value is divided by the $D_{75}$ value, and defined as the particle size distribution ratio ($\gamma$) of the particles.

(3) Coefficient of travelling friction ($\mu K$) of the film

Figure 3:
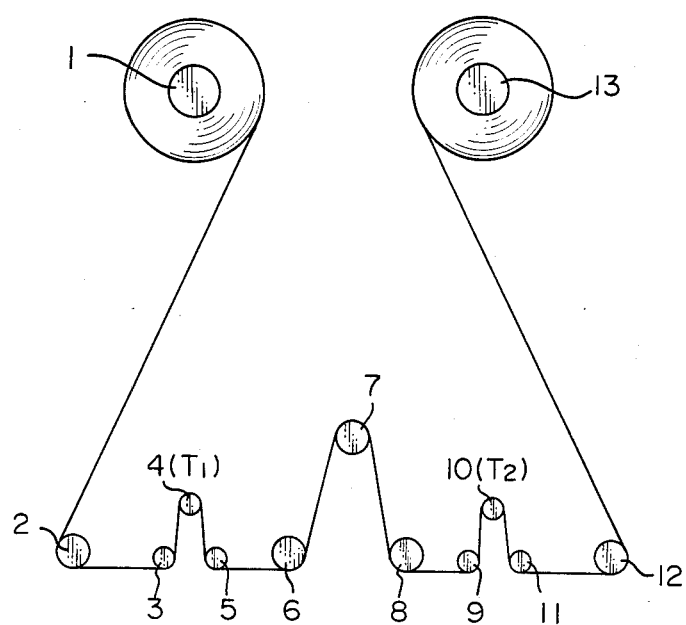
FIG. 3 is a view showing the outline of a device for measuring the coefficient of travelling friction ($\mu k$) of a film.

Measured in the following manner by using a device shown in FIG. 3. In FIG. 3, the reference numeral 1 represents a pay-off reel; 2, a tension controller; 3, 5, 6, 8, 9 and 11, a free roller; 4, a tension detector (inlet); 7, stainless steel (SUS 304) fixed rod (outside diameter 5 mm); 10, a tension detector (outlet); 12, a guide roller; and 13, a take-up reel.

A film cut to a width of 0.5 inch in an environment kept at a temperature of 20° C. and a humidity of 60% is brought into contact with the solid rod (surface roughness 0.3 micron) at an angle $\theta = (152/180\pi)$ radian (152°) and moved in frictional contact therewith at a speed of 200 cm/min. The tension $T_1$ at the inlet is adjusted to 35 g by the tension controller 2, and the outlet tension ($T_2$ in grams) is detected by the outlet tension detector 10 after the film has travelled 90 meters. The coefficient of travelling friction, $\mu K$, is calculated in accordance with the following equation.

$$\mu k = \frac{2.303}{\theta} \log \frac{T_2}{T_1} = 0.868 \log \frac{T_2}{35}$$

(4) Flatness of the film surface

Measured by the CLA (center line average) method in accordance with JIS B-0601. By using a needle-contacting surface roughness tester (SURFCOM 3B made by Tokyo Seimitsu Co., Ltd.), a chart (film surface roughness curve) is drawn under a load of 0.07 g with a needle radius of 2 microns. A portion having a measured length L is picked up from the film surface roughness curve in the direction of its center line. The center line of this portion is assumed to be X axis and the direction of the longitudinal multiplication, Y axis, and the roughness curve is expressed as $Y = f(x)$. The value given by the following equation (Ra in microns) is defined as the flatness of the film surface.

$$Ra = \frac{1}{L} \int_0^L |f(x)| dx$$

In this invention, the standard length is set at 0.25 mm, and the measurement is made through 8 replicates. The three largest measured values are excluded, and an average of the remaining five measured values is calculated and defined as Ra.

(5) Abrasion resistance

The abrasion resistance of the travelling surface of the polyester film substrate is evaluated by using a mini-supercalender. The calender is a 5-unit calender consisting of nylon rolls and steel rolls. The treating temperature is 80° C., and the linear pressure on the film is 200 kg/cm. The film is caused to travel at a speed of 50 meters/min. When a total length of 2000 m of the film has travelled, the abrasion resistance of the film is evaluated by staining on the top roller of the calender on the following standards.

⊚: no staining on the nylon roll
○: scarcely any staining on the nylon roll
△: some staining on the nylon roll
X: much staining on the nylon roll
XX: heavy staining on the nylon roll (6) Void ratio A small film sample is fixed to a sample stand, and the film surface is subjected to ion-etching treatment under the following conditions using a sputtering device (Model JFC-1100, ion sputtering device made by Nippon Electronics Co., Ltd.). The sample stand is set up in the bell jar, and the degree of vacuum was raised to a vacuum of about $10^{-3}$ torr, and ion etching was performed at a voltage of 0.25 KV and a current of 12.5 mA for about 10 minutes. Furthermore, by using the same device, gold sputtering is carried out on the film surface to form a thin gold film layer having a thickness of about 200 Å. The sample film is then observed under a scanning electron microscope at a magnification of 10,000 to 30,000. The measurement of voids is carried out only with regard to inert fine particles having a particle diameter of at least 0.3 $\mu$m.

(7) Haze

The haze of the film is determined by an HTR meter equipped with an integrating sphere (made by Japan Precision Optics Co., Ltd.) in accordance with JIS-K674.

(8) Intrinsic viscosity [$\eta$]

Measured at 25° C. in o-chlorophenol as a solvent. The unit is 100 cc/g.

(9) Volume shape factor f

The particles are photographed through a scanning electron microscope (for example at 5000×) over ten visual fields. The average value of the maximum diameters of the particles is calculated in each of the visual fields using an image analysis processing device Luzex (made by Japan Regulator Co., Ltd.). Furthermore, the average value of the maximum diameters in the ten visual fields is calculated and defined as D.

The volume ($V = \pi/6 d^3$) of the particles is calculated from the average particle diameter d of the particles determined in paragraph (1) above, and the volume shape factor f is calculated in accordance with the following equation.

$$f = V/D^3$$

where V is the volume ($\mu$m$^3$) of the particles and D is the maximum diameter ($\mu$m) of the particles.

The following examples illustrate the present invention more specifically.

COMPARATIVE EXAMPLE 1

Dimethyl terephthalate and ethylene glycol were polymerized in a customary manner in the presence of manganese acetate (ester-interchange catalyst), antimony trioxide (polymerization catalyst), phosphoric acid (stabilizer) and kaolin (lubricant) having an average particle diameter of 1.2 $\mu$m and a volume shape factor of 0.06 to give polyethylene terephthalate having an intrinsic viscosity of 0.62.

Pellets of polyethylene terephthalate were dried at 170° C. for 3 hours, fed into a hopper of an extruder, and melted at a temperature of 280° to 300° C. The molten polymer was extruded through a 1 mm slit die onto a rotating drum having a surface finish of about 0.3S and kept at a surface temperature of 20° C. to give an unstretched film having a thickness of 200 $\mu$m.

The unstretched film was pre-heated to 75° C., and heated between a low-speed roll and a high-speed roll by an IR heater having a surface temperature of 900° C. and located 15 mm above the film, longitudinally stretched to 3.5 times by the difference in surface speed between the low-speed and high-speed rolls, quenched, subsequently fed to a stenter, and stretched to 3.7 times transversely at 105° C. The resulting biaxially stretched film was heat-set for 5 seconds as 205° C. to give a heat-set biaxially stretched film having a thickness of 15 $\mu$m.

The resulting film had a void ratio of 1.7, and a white powder adhered to the film during calendering. The properties of the film are shown in Table 1.

COMPARATIVE EXAMPLE 2

Pellets of polyethylene terephthalate were obtained in the same way as in Comparative Example 1 except that calcium carbonate having an average particle diameter of 0.8 μm and a volume shape factor of 0.24 was used instead of kaolin.

Using the pellets, a biaxially oriented film having a thickness of 15 μm was prepared in the same way as in Comparative Example 1. The resulting film had a void ratio of 2.5. It had good travelling property, but a white powder occurred in the calendering step. The properties of the film are shown in Table 1.

EXAMPLES 1-5 AND COMPARATIVE EXAMPLES 3-4

In each run, pellets of polyethylene terephthalate were prepared in the same way as in Comparative Example 1 except that silicone resin particles [having the composition (CH$_3$)OSiO] having each of the average particle diameters shown in Table 1, a volume shape factor of 0.52 to 0.48 and a particle size distribution ratio [γ] of 1.1 to 2.0 were used instead of kaolin.

A heat-set biaxially oriented film having a thickness of 15 μm was produced in the same way as in Comparative Example 1 except that the resulting pellets were used instead of the pellets used in Comparative Example 1.

The properties of the resulting films are shown in Table 1. The films obtained in Examples 1 to 5 had excellent qualities.

COMPARATIVE EXAMPLE 6

Pellets of polyethylene terephthalate were produced in the same way as in Comparative Example 5 except that calcium carbonate having an average particle diameter of 0.8 μm and a volume shape factor of 0.45 was used instead of kaolin.

A biaxially oriented film having a thickness of 15 μm was produced in the same way as in Example 5 except that the resulting pellets were used instead of the pellets used in Comparative Example 5 and the stretch ratio in the longitudinal direction was changed to 4.0 times and the stretch ratio in the transverse direction changed to 3.5 times. A magnetic tape was produced by using this film. The resulting magnetic tape had good travelling property, but a white powder occurred in the calendering step.

The properties of this film are shown in Table 2.

EXAMPLE 6

Pellets of polyethylene terephthalate were produced in the same way as in Comparative Example 5 except that silicone resin particles having the composition CH$_3$SiO$_{1.5}$, an average particle diameter of 2 μm and a volume shape factor of 0.50. A heat-set biaxially oriented film having a thickness of 15 μm was produced in the same way as in Comparative Example 5 except that

TABLE 1

| | Item | CE. 1 | CE. 2 | E. 1 | E. 2 | E. 3 | CE. 3 | E. 4 | E. 5 | CE. 4 |
|---|---|---|---|---|---|---|---|---|---|---|
| Particles added | Type of particles | kaolin | calcium carbonate | silicone resin particles | silicone resin particles | silicone resin particles | silicone resin particles | silicone resin particles | silicone resin particles | silicone resin particles |
| | Average particle diameter (μm) | 1.2 | 0.8 | 0.1 | 0.8 | 2.0 | 5 | 0.8 | 0.8 | 0.8 |
| | Volume shape factor | 0.06 | 0.24 | 0.51 | 0.50 | 0.49 | 0.48 | 0.50 | 0.50 | 0.50 |
| | Particle size distribution ratio (γ) | 2 | 2.7 | 1.1 | 1.2 | 1.1 | 1.2 | 1.2 | 1.2 | 1.2 |
| | Amount (wt. %) | 0.1 | 0.1 | 0.1 | 0.1 | 0.1 | 0.1 | 0.01 | 0.5 | 1.2 |
| Properties of the film | Surface roughness (Ra, μm) | 0.032 | 0.020 | 0.015 | 0.019 | 0.026 | 0.081 | 0.010 | 0.035 | 0.075 |
| | Coefficient of friction after 200 passes | 0.47 | 0.28 | 0.23 | 0.20 | 0.23 | 0.20 | 0.27 | 0.22 | 0.22 |
| | Void ratio | 1.7 | 2.5 | 1.02 | 1.04 | 1.08 | 1.3 | 1.0 | 1.01 | 1.05 |
| | Haze (%) | 3.5 | 4.2 | 1.2 | 1.0 | 1.5 | 4.5 | 0.8 | 2.5 | 5.7 |
| | Abrasion resistance | X | XX | ⊚ | ⊚ | ⊚ | ○ | ⊚ | ○ | ○ |
| | Proportion of void-free particles | 0 | 0 | 86 | 85 | 79 | 32 | 92 | 88 | 72 |

E. Example; CE. Comparative Example

COMPARATIVE EXAMPLE 5

Dimethyl terephthalate and ethylene glycol were polymerized in a customary manner in the presence of manganese acetate (ester-interchange catalyst), antimony trioxide (polymerization catalyst), phosphorous acid (stabilizer) and kaolin (lubricant) having an average particle diameter of 1.2 μm, a specific surface area of 20 m$^2$/g and a volume shape factor of 0.06 to give polyethylene terephthalate having an intrinsic viscosity of 0.62.

A heat-set biaxially oriented film having a thickness of 15 μm was produced from the resulting PET pellets in the same way as in Comparative Example 1.

A magnetic tape was produced using the resulting film. At this time, a white powder adhered in the calendering operation, and the resulting magnetic tape showed much dropout and was unsatisfactory.

The properties of the film are shown in Table 2.

the resulting pellets were used instead of the pellets used in Comparative Example 5. The properties of the film are shown in Table 2.

EXAMPLE 7

A biaxially oriented film was produced in the same way as in Example 6 except that the longitudinal stretching was carried out at 70° C. at a stretch ratio of 4.0, and the transverse stretching was carried out at 105° C. at a stretch ratio of 3.5. The properties of the film are shown in Table 2.

EXAMPLE 8

The unstretched film obtained in Example 6 was stretched to 2.0 times in the longitudinal direction, and then to 3.5 times in the transverse direction at 105° C. The stretched film was heat-set, then again stretched longitudinally to 2.5 times at 150° C., and then again heat-set at 205° C. for 10 seconds to give a biaxially oriented film. The properties of the film are shown in Table 2.

calcium carbonate (Comparative Example 9). The properties of these films are shown in Table 2.

TABLE 2

| | Item | CE. 5 | CE. 6 | CE. 7 | CE. 8 | CE. 9 | E. 6 | E. 7 | E. 8 |
|---|---|---|---|---|---|---|---|---|---|
| Particles added | Type of particles | kaolin | calcium carbonate | calcium carbonate | calcium carbonate | titanium dioxide | silicone resin particles | silicone resin particles | silicone resin particles |
| | Volume shape factor | 0.06 | 0.45 | 0.45 | 0.45 | 0.46 | 0.50 | 0.50 | 0.50 |
| | Average particle diameter ($\mu$m) | 1.2 | 0.8 | 0.8 | 0.8 | 0.4 | 2 | 2 | 2 |
| | Particle size distribution ratio ($\gamma$) | 1.8 | 1.6 | 1.6 | 1.6 | 1.5 | 1.1 | 1.1 | 1.1 |
| | Amount (wt. %) | 0.3 | 0.3 | 0.3 | 0.8 | 0.4 | 0.05 | 0.05 | 0.05 |
| Film-forming conditions | Longitudinal stretch ratio | 3.5 | 3.5 | 4.0 | 2.0 × 2.5 | 4.0 | 3.5 | 4.0 | 2.0 × 2.5 |
| | Longitudinal stretching temperature (°C.) | 80 | 80 | 70 | 80 | 70 | 80 | 70 | 80 |
| | Transverse stretch ratio | 3.7 | 3.7 | 3.5 | 3.5 | 3.5 | 3.7 | 3.5 | 3.5 |
| | Transverse stretching temperature (°C.) | 105 | 105 | 105 | 105 | 105 | 105 | 105 | 105 |
| | Heat-treatment temperature (°C.) | 205 | 205 | 205 | 205 | 205 | 205 | 205 | 205 |
| Properties of the film | Surface roughness Ra ($\mu$m) | 0.035 | 0.020 | 0.018 | 0.022 | 0.012 | 0.012 | 0.010 | 0.009 |
| | Coefficient of friction after 200 passes | 0.45 | 0.25 | 0.30 | 0.20 | 0.35 | 0.21 | 0.23 | 0.25 |
| | Void ratio | 1.4 | 1.9 | 2.0 | 1.8 | 1.6 | 1.1 | 1.15 | 1.05 |
| | Haze (%) | 3.3 | 3.7 | 4.6 | 5.8 | 3.2 | 1.2 | 1.0 | 1.4 |
| | Abrasion resistance | O | X | X | Δ | X | O | ⊙ | O |
| | Proportion of void-free particles (%) | 10 | 5 | 0 | 10 | 5 | 90 | 85 | 95 |

E. Example; CE. Comparative Example

The films obtained in Example 6 to 8 were hardly seen to contain voids around the lubricant particles, and developed no white powder by calendering, etc. Magnetic tapes obtained by using these films had reduced dropout and markedly improved travelling characteristics.

COMPARATIVE EXAMPLES 7-9

The unstretched film obtained in Comparative Example 6 was stretched and heat-set as in Example 7 to give a biaxially oriented film (Comparative Example 7). The same unstretched film was stretched and heat-set as in Example 8 to give a biaxially oriented film (Comparative Example 8). A biaxially oriented film was produded in the same way as in Comparative Example 7 except that 0.5% by weight of titanium dioxide having an average particle diameter of 0.4 $\mu$m was used instead of

EXAMPLES 9-10 AND COMPARATIVE EXAMPLES 10-11

In each run, pellets of polyethylene-2,6-naphthalate (intrinsic viscosity 0.60) containing each of the particles indicated in Table 3 were dried at 170° C. for 3 hours, fed to a hopper of an extruder, and melted at a temperature of 280° to 300° C. The molten polymer was extruded through a 1 mm slit-like die onto a rotating drum having a surface finish of about 0.3S and kept at a surface temperature of 20° C. to form an unstretched film having a thickness of 200 $\mu$m.

The unstretched film was stretched and heat-set by the same procedure as in Example 5 under the conditions shown in Table 3.

The properties of the biaxially oriented polyester films obtained are shown in Table 3.

TABLE 3

| Item | | CE. 10 | CE. 11 | E. 9 | E. 10 |
|---|---|---|---|---|---|
| Particles added | Type of particles | kaolin | calcium carbonate | silicone resin particles | silicone resin particles |
| | Volume shape factor | 0.06 | 0.45 | 0.50 | 0.50 |
| | Average particle diameter ($\mu$m) | 1.2 | 0.8 | 2 | 2 |
| | Particle size distribution ratio ($\gamma$) | 1.8 | 1.6 | 1.1 | 1.1 |
| | Amount (wt. %) | 0.3 | 0.3 | 0.05 | 0.05 |
| Film-forming conditions | Longitudinal stretch ratio | 3.5 | 2.0 × 2.5 | 3.5 | 2.0 × 2.5 |
| | Longitudinal stretching temperature (°C.) | 120 | 120 | 120 | 120 |
| | Transverse stretch ratio | 3.7 | 3.5 | 3.7 | 3.5 |
| | Transverse stretching temperature (°C.) | 115 | 115 | 115 | 115 |
| | Heat-treatment temperature (°C.) | 205 | 205 | 205 | 205 |
| Properties of the film | Surface roughness Ra ($\mu$m) | 0.038 | 0.022 | 0.013 | 0.012 |
| | Coefficient of friction after 200 passes | 0.39 | 0.29 | 0.20 | 0.022 |
| | Void ratio | 1.5 | 2.0 | 1.15 | 1.15 |
| | Haze (%) | 4.5 | 4.2 | 1.4 | 1.8 |
| | Abrasion resistance | X | Δ | ⊙ | ⊙ |
| | Proportions of void-free | 10 | 5 | 89 | 93 |

TABLE 3-continued

| Item | CE. 10 | CE. 11 | E. 9 | E. 10 |
|---|---|---|---|---|
| particles (%) | | | | |

E. Example; CE. Comparative Example

COMPARATIVE EXAMPLES 12-16

In each run, dimethyl terephthalate and ethylene glycol were polymerized in a customary manner in the presence of manganese acetate (ester-interchange catalyst), antimony trioxide (polymerization catalyst), phosphorous acid (stabilizer) and the lubricant particles shown in Table 4 to give polyethylene terephthalate having an intrinsic viscosity of 0.65.

The lubricants were added as a glycol dispersion obtained by dispersing them in ethylene glycol by ultrasonication.

Pellets of the polyethylene terephthalate were dried at 170° C., melt-extruded at 280° C., and quenched and solidified on a casting drum kept at 40° C. to form an unstretched film having a thickness of 200 μm.

The unstretched film was pre-heated to 75° C., and stretched to 3.6 times while being heated between a low-speed roll and a high-speed roll by an IR heater having a surface temperature of 900° C. and located 15 mm above the film. It was then quenched, fed to a stenter and stretched to 3.7 times at 105° C. in the transverse direction. The resulting biaxially stretched film was heat-set at 205° C. for 5 seconds to give a heat-set biaxially oriented film having a thickness of 15 μm.

The properties of the resulting films are shown in Table 4.

The film obtained in Comparative Example 12 developed a white powder in the calender operation and was unsatisfactory.

The film obtained in Comparative Example 13 had fairly satisfactory surface roughness and abrasion resistance, but showed an increased coefficient of friction and a high travelling resistance in repeated travelling. Hence, it cannot withstand use as a base film of video tapes.

The film of Comparative Example 14 was produced in an attempt to improve the insufficient travelling property of the film of Comparative Example 11 by adding calcium carbonate having an average particle diameter of as large as 0.8 μm together with kaolin at the sacrifice of surface flatness. But large voids occurred around the large-diameter calcium carbonate particles, and abrasion by calendering was vigorous. The resulting film therefore is not best suited as a base film of a magnetic material or as a condenser film.

The films obtained in Comparative Examples 15 and 16 had insufficient travelling property and abrasion resistance.

EXAMPLES 11-14

In each run, polyethylene terephthalate was produced in the same way as in Comparative Examples 12 to 16 except that each of the lubricants shown in Table 5 was used. A heat-set biaxially oriented film was produced as in Comparative Examples 12 to 16 using the resulting polyethylene terephthalate.

The properties of the films obtained are shown in Table 5.

Since the silicone resin particles having a large diameter (composition: $CH_3SiO_{1.5}$) were used, the occurrence of voids around the particles is inhibited. Hence, no abraded powder occurs in the processing steps and tape travelling path, and these films are used very satisfactorily as a base film of magnetic tapes.

TABLE 4

| | Item | CE. 12 | CE. 13 | CE. 14 | CE. 15 | CE. 16 |
|---|---|---|---|---|---|---|
| Particles added | Type of the lubricant | calcium carbonate | kaolin | calcium carbonate/ kaolin | titanium dioxide | calcium carbonate/ titanium dioxide |
| | Volume shape factor | 0.46 | 0.08 | 0.45/0.08 | 0.46 | 0.45/0.46 |
| | Average particle diameter (μm) | 0.6 | 0.4 | 0.8/0.4 | 0.33 | 0.8/0.33 |
| | Particle size distribution ratio (γ) | 1.6 | 1.8 | 1.6/1.8 | 1.5 | 1.6/1.5 |
| | Amount (wt. %) | 0.3 | 0.3 | 0.2/0.05 | 0.5 | 0.2/0.2 |
| Properties of the film | Surface roughness Ra (μm) | 0.018 | 0.010 | 0.020 | 0.009 | 0.017 |
| | μk after 50 passes | 0.22 | 0.42 | 0.23 | 0.4 | 0.22 |
| | Void ratio (large particles) | 1.7 | 1.3 | 1.9 | 1.4 | 1.9 |
| | Void ratio (small particles) | — | — | 1.3 | — | 1.4 |
| | Haze (%) | 9.0 | 2.0 | 7.0 | 15 | 12 |
| | Abrasion resistance | XX | O | X | X | XX |
| | Proportion of void-free particles | | | | | |
| | (large particles) | 5 | 10 | 0 | 10 | 0 |
| | (small particles) | — | — | 5 | — | 10 |

CE. Comparative Example

TABLE 5

| | Item | E. 11 | E. 12 | E. 13 | E. 14 |
|---|---|---|---|---|---|
| Particles added | Type of the lubricant | silicone/ kaolin | silicone/ kaolin | silicone/ titanium dioxide | silicone/ silica |
| | Volume shape factor | 0.52/0.06 | 0.52/0.06 | 0.49/0.46 | 0.52/0.3 |
| | Average particle diameter (μm) | 0.8/0.4 | 0.8/0.33 | 1.2/0.3 | 0.8/0.4 |
| | Particle size distribution ratio (γ) | 1.05/1.8 | 1.05/1.8 | 1.05/1.5 | 1.05/1.6 |
| | Amount (wt. %) | 0.2/0.05 | 0.2/0.2 | 0.2/0.2 | 0.2/0.1 |
| Properties of the film | Surface roughness Ra (m) | 0.020 | 0.016 | 0.035 | 0.018 |
| | k after 50 passes | 0.17 | 0.16 | 0.25 | 0.15 |

TABLE 5-continued

| Item | E. 11 | E. 12 | E. 13 | E. 14 |
| --- | --- | --- | --- | --- |
| Void ratio (large particles) | 1.0 | 1.0 | 1.0 | 1.0 |
| Void ratio (small particles) | 1.3 | 1.4 | 1.4 | 1.3 |
| Haze (%) | 2.0 | 8.0 | 7.0 | 3.0 |
| Abrasion resistance | ◎ | ○ | ○ | ◎ |
| Proportion of void-free particles | | | | |
| (large particles) | 95 | 95 | 95 | 95 |
| (small particles) | 10 | 10 | 0 | 55 |

E.: Example

What is claimed is:

1. A biaxially oriented film formed from an intimate mixture comprising (I) an aromatic polyester, and (II) 0.005 to 1.0% by weight, based on the aromatic polyester, of fine particles of a silicone resin having (a) a structural unit in a three-dimensional polymer chain represented by the following formula (A)

$$R_xSiO_{2-x/2} \tag{A}$$

wherein R represents a hydrocarbon group having 1 to 7 carbon atoms, and x is a number of from 1 to 1.2, (b) a volume shaped factor (f), represented by the following formula (B), of more than 0.4 but not exceeding $\pi/6$ $$f = V/D^3 \tag{B}$$

wherein V is the average volume ($\mu m^3$) of the particles and D is the average maximum particle diameter ($\mu m$) of the particle, and (c) an average particle diameter of 0.01 to 4 $\mu m$.

2. The film of claim 1 wherein the aromatic polyester is derived from an aromatic dicarboxylic acid as a main acid component and an aliphatic glycol as a main glycol component.

3. The film of claim 1 wherein in formula (A), R represents a linear or branched alkyl group having 1 to 7 carbon atoms, a phenyl group, or a tolyl group.

4. The film of claim 1 wherein in formula (A), x is a number of from 1 to 1.1.

5. The film of claim 1 wherein the volume shape factor f of the silicone resin particles is between 0.44 and $\pi/6$.

6. The film of claim 1 wherein the average particle diameter of the silicone resin particles is between 0.05 and 3 $\mu m$.

7. The film of claim 1 wherein the amount of the silicone resin particles is 0.01 to 0.5% by weight based on the aromatic polyester.

8. The film of claim 1 wherein the silicone resin particles have a particle size distribution ratio ($\gamma$), defined by the following equation (C) of 1 to 1.4, $$\gamma = D_{25}/D_{75} \tag{C}$$

wherein $D_{25}$ is the particle diameter ($\mu m$) of the silicone resin particles when their cumulative weight is 25%, and $D_{75}$ is the particle diameter of the silicone resin particles when their cumulative weight is 75%.

9. The film of claim 1 wherein when the film surface is ion-etched and when observed under an electron microscope, the peripheral surfaces of the silicone resin particles are substantially in contact with the aromatic polyester substrate.

10. A biaxially oriented film formed from an intimate mixture comprising (I) an aromatic polyester, (II) 0.005 to 1.0% by weight, based on the aromatic polyester, of fine particles of a silicone resin having (a) a structural unit in a three-dimensional polymer chain represented by the following formula (A)

$$R_xSiO_{2-x/2} \tag{A}$$

wherein R represents a hydrocarbon group having 1 to 7 carbon atoms, and x is a number of from 1 to 1.2, (b) a volume shape factor (f), represented by the following formula (B), of more than 0.4 but not exceeding $\pi/6$ $$f = V/D^3 \tag{B}$$

wherein V is the average volume ($\mu m^3$) of the particles and D is the average maximum particle diameter ($\mu m$) of the particle, and (c) an average particle diameter of 0.01 to 4 $\mu m$, and (III) 0.005 to 1% by weight, based on the aromatic polyester, of inert fine particles having an average particle diameter of 0.01 to 1 $\mu m$ but being smaller than the average particle diameter of the silicone resin particles.

11. A magnetic recording medium comprising the biaxially oriented film of claim 1 or 10 and a magnetic layer on one or both surfaces of the film.

12. The film of claim 2 wherein in formula (A), R represents methyl or phenyl and x is a number of from 1 to 1.1 and wherein the volume shaped factor f of the silicone resin particles is between 0.44 and $\pi/6$ and the average particle diameter of the silicone resin particles is between 0.05 and 3 $\mu m$.

13. The film of claim 8 wherein the particle size distribution ratio defined by the equation (C) is from 1 to 1.15.

14. A biaxially oriented film according to claim 10 wherein said inert fine particles are selected from the group consisting of silicic anhydride, hydrous silicic acid, aluminum oxide, aluminum silicate, monolithium phosphate, trilithium phosphate, sodium phosphate, calcium phosphate, barium sulfate, titanium oxide, lithium benzoate, double salts of the foregoing, glass powder, clay, talc or diatomaceous earth.

15. The biaxially oriented film of claim 10 wherein the silicone resin particles (II) have an average particle diameter of from 0.3 to 2 $\mu m$ and the inert fine particles (III) have an average particle diameter of 0.05 to 0.8 $\mu m$.

16. The biaxially oriented film of claim 14 wherein the content of the silicone resin particles (II) is from 0.04 to 0.05% by weight and the content of the inert particles (III) is from 0.01 to 0.5% by weight.

17. The magnetic recording medium according to claim 11 wherein said biaxially oriented film has a thickness of from 1 to 5 microns.

* * * * *

UNITED STATES PATENT AND TRADEMARK OFFICE
CERTIFICATE OF CORRECTION

PATENT NO. : 4,761,327
DATED : August 2, 1988
INVENTOR(S) : HISHASHI HAMANO, ET AL.

It is certified that error appears in the above-identified patent and that said Letters Patent is hereby corrected as shown below:

On the patent's face, under "Foreign Application Priority Data", the filing date of Japanese Application No. 61-205769 should be changed from "January 20, 1986" to --September 3, 1986--.

IN THE ABSTRACT

Last line, delete "on", insert --of--.

IN THE CLAIMS

Column 20, claim 10, line 30, delete "0.01", insert --0.3--.

Signed and Sealed this

Thirteenth Day of December, 1988

Attest:

DONALD J. QUIGG

Attesting Officer

Commissioner of Patents and Trademarks